US008094105B2

(12) United States Patent
Lim et al.

(10) Patent No.: US 8,094,105 B2
(45) Date of Patent: Jan. 10, 2012

(54) NAVIGATION FOR A NON-TRADITIONALLY SHAPED LIQUID CRYSTAL DISPLAY FOR MOBILE HANDSET DEVICES

(75) Inventors: David Lim, Vernon Hills, IL (US); Mark Finney, Chicago, IL (US); Mark Oliver, Mundelein, IL (US); Paul Pierce, Grayslake, IL (US); Michael Sawadski, Mount Prospect, IL (US); Karl Voss, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1138 days.

(21) Appl. No.: 11/863,965

(22) Filed: Sep. 28, 2007

(65) Prior Publication Data

US 2009/0085851 A1    Apr. 2, 2009

(51) Int. Cl.
 *G09G 3/36*    (2006.01)

(52) U.S. Cl. .......................................... 345/87; 345/100

(58) Field of Classification Search ........... 345/156–173
See application file for complete search history.

(56) References Cited

U.S. PATENT DOCUMENTS

| | | | | |
|---|---|---|---|---|
| 6,130,665 A * | 10/2000 | Ericsson | ........................ | 345/173 |
| 6,527,555 B1 * | 3/2003 | Storm | ............................ | 434/131 |
| 6,816,071 B2 * | 11/2004 | Conti | ............................. | 340/540 |
| 7,605,796 B2 * | 10/2009 | Kaminaga | ..................... | 345/104 |
| 7,623,119 B2 * | 11/2009 | Autio et al. | ..................... | 345/173 |
| 7,877,705 B2 * | 1/2011 | Chambers et al. | ............. | 715/835 |
| 2002/0027549 A1 * | 3/2002 | Hirshberg | ...................... | 345/168 |
| 2003/0048714 A1 * | 3/2003 | Conti | ............................ | 369/53.1 |
| 2003/0197736 A1 * | 10/2003 | Murphy | ........................ | 345/780 |
| 2005/0140661 A1 * | 6/2005 | Collins | .......................... | 345/173 |
| 2006/0073888 A1 * | 4/2006 | Nguyen et al. | .................. | 463/27 |
| 2007/0046646 A1 | 3/2007 | Kwon et al. | | |
| 2009/0007596 A1 * | 1/2009 | Goldstein et al. | ............... | 63/1.11 |
| 2009/0100366 A1 * | 4/2009 | Fitzmaurice et al. | ......... | 715/767 |
| 2009/0137311 A1 * | 5/2009 | Iverson et al. | ................... | 463/20 |
| 2010/0033423 A1 * | 2/2010 | Iio | ................................ | 345/156 |

FOREIGN PATENT DOCUMENTS

| | | |
|---|---|---|
| KR | 20020038177 A | 5/2002 |
| WO | 03102905 A1 | 12/2003 |
| WO | 2005116744 A1 | 12/2005 |

OTHER PUBLICATIONS

Phillipe Starck Watches, Circular LCD—Clock Hands Utilize Full Active Area of Display.
Carrera Men's Cool LCD Aluminum Rubber Strap Watch.
Casio SPF-60-1AVER Watch; Casio Europe GmbH, 1995-2007.
Casio CHR200-1 Sports Timepiece Watch.
International Search Report dated Feb. 26, 2009, in Connection with Related PCT Application No. PCT/US2008/076111.

\* cited by examiner

*Primary Examiner* — Nitin Patel

(57) ABSTRACT

A method, apparatus, and electronic device for displaying data are disclosed. A non-rectangular addressable liquid crystal display 402 with a non-rectangular active area active matrix 334 may display an adjustable presentation of data. A display-integrated control key may control the presentation of data. A scrolling navigation control may scroll through the adjustable presentation of the data.

20 Claims, 6 Drawing Sheets

*100*

NAVIGATION FOR A NON-TRADITIONALLY SHAPED LIQUID CRYSTAL DISPLAY FOR MOBILE HANDSET DEVICES

FIELD OF THE INVENTION

The present invention relates to a method and system for displaying data. The present invention further relates to displaying data using non-traditional displays.

INTRODUCTION

Mobile computational devices may present data in a visual manner. One mechanism used to present visual data is a liquid crystal display (LCD). A traditional liquid crystal display (LCD) may be a thin, flat, rectangular display device. The LCD may have multiple color or monochrome pixels arranged before a light source, the pixels being activated or deactivated to create an image projected on the LCD screen.

Most mobile telecommunications devices that have displays have rectangular displays. These displays may be rectangular to more efficiently fit the casing of the mobile telecommunications devices. Further, most visual data is presented in the format in which it was originally created, as if on paper. Paper is two-dimensional. Paper is cut into rectangles to prevent waste, among other reasons. Thus, photos on paper and writing on paper also took a two-dimensional and rectangular form to match the medium. This form carried over to the electronic visual displays used by computational devices.

SUMMARY OF THE INVENTION

A method, apparatus, and electronic device for displaying data are disclosed. A non-rectangular liquid crystal display with a non-rectangular active area active matrix may display an adjustable presentation of data. A display-integrated control may control the presentation of data. A scrolling navigation control may scroll through the adjustable presentation of the data.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
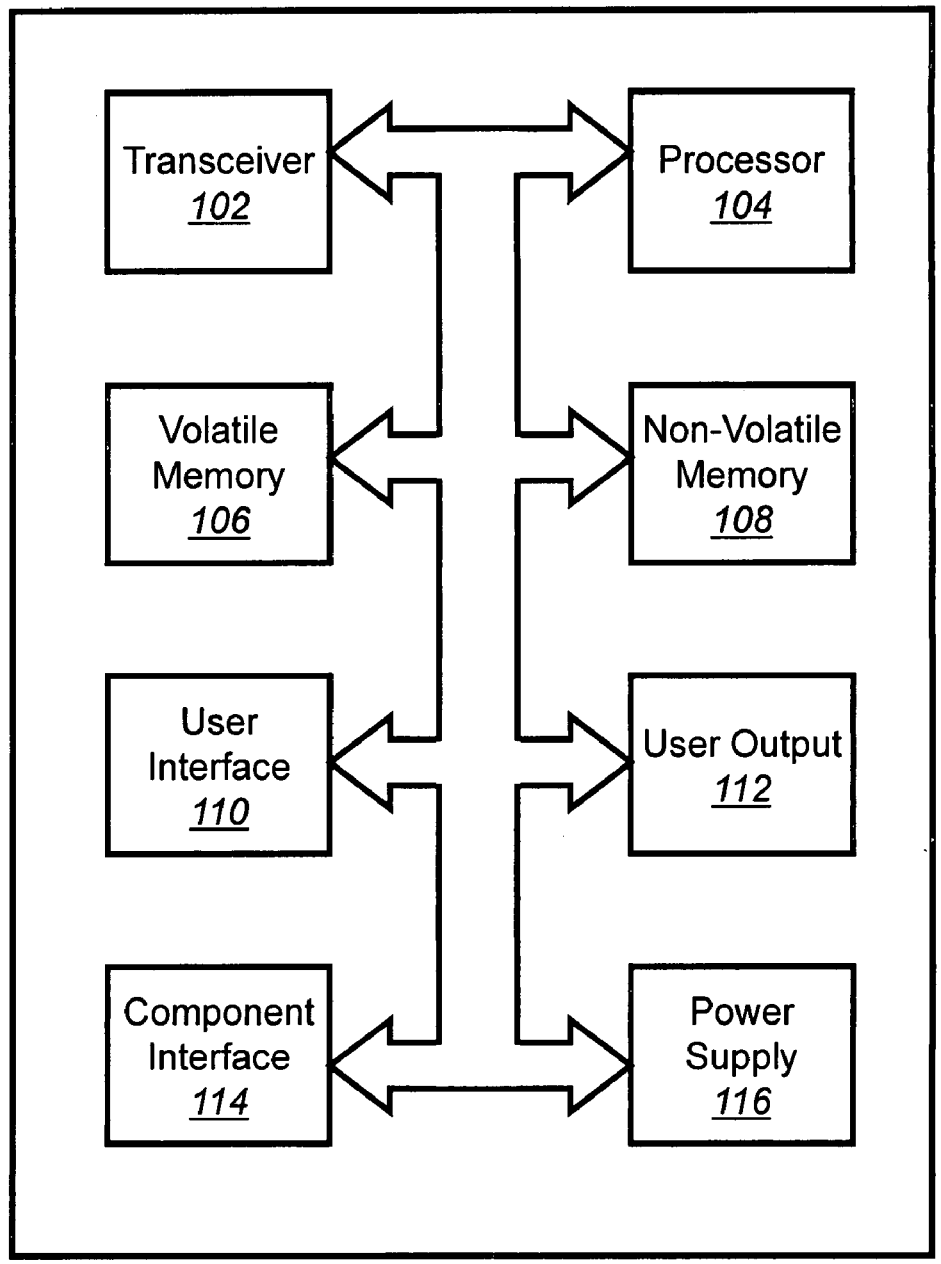
FIG. 1 illustrates in a block diagram one embodiment of a handheld device.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, apparatus, and electronic device for displaying data are disclosed. A non-rectangular addressable liquid crystal display with a non-rectangular active area active matrix may display an adjustable presentation of data. A display-integrated control key may control the presentation of data. A scrolling navigation control may scroll through the adjustable presentation of the data.

A major function of modern computation devices is presenting a set of data to a user in a format that allows the user to easily grasp how different data points in the set of data relate to one and other. Most modern computation devices still present data in a traditional way, indistinguishable from how the data was originally presented on paper. Few modern computation devices take advantage of the expanded presentation capability to provide data in a more efficient and informative manner. For example, a circular display device may more efficiently present certain types of data, such as time, geography, holographic three-dimensional images of objects, or other items of information that are ill-server by a rectangular presentation. A non-traditional display may also show a data list in both a conventional manner or in a new manner, such as in a dial list format, having the data presented in a circular arrangement.

Further, to better observe the connections between the data points in a dataset, a user may need the ability to manipulate the presentation being shown. A pie chart may need to be rotated to bring a particular segment into greater focus. A global map may need to be scrolled to a different portion of the world. A clock display may need to be rotated to bring a time of import into focus. A holographic image of an object may need to be rotated or magnified to get a better view of the object. A data list may be rotated to allow a user to scroll through data presented in a dial list format. Having the ability to manipulate the presentation of data may greatly increase the efficacy of the circular display.

FIG. 1 illustrates in a block diagram one embodiment of a mobile device 100 which may use a circular display to present a set of data to a user. While a handheld device is described, any computing device, such as a desktop computer or a server, may use the circular display. The handheld device 100 may access the information or data stored in a network. The handheld device 100 may support one or more applications for performing various communications with the network. The handheld device 100 may implement any operating system, such as Windows or UNIX, for example. Client and server software may be written in any programming language, such as C, C++, Java or Visual Basic, for example. The handheld device 100 may be a mobile phone, a laptop, a personal digital assistant (PDA), or other portable device. For some embodiments of the present invention, the handheld device 100 may be a WiFi capable device, which may be used to access the network for data or by voice using voice over internet protocol (VOIP). The handheld device 100 may include a transceiver 102 to send and receive data over the network.

The handheld device 100 may include a controller or processor 104 that executes stored programs. The controller or processor 104 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The handheld device 100 may also include a volatile memory 106 and a non-volatile memory 108 to be used by the processor 104. The volatile 106 and nonvolatile data storage 108 may include one or more electrical, magnetic or optical memories such as a random access memory (RAM, cache, hard drive, or other memory device. The memory may have a cache to speed access to specific data. The memory may also be connected to a compact disc-read only memory (CD-ROM), digital video disc-read only memory (DVD-ROM, DVD read write input, tape drive or other removable memory device that allows media content to be directly uploaded into the system.

The handheld device 100 may include a user input interface 110 that may comprise elements such as a keypad, display, touch screen, or any other device that accepts input. The handheld device 100 may also include a user output device 112 that may comprise a display screen and an audio interface that may comprise elements such as a microphone, earphone, and speaker. The handheld device 100 also may include a component interface 114 to which additional elements may be attached, for example, a universal serial bus (USB) interface or an audio-video capture mechanism. Finally, the handheld device 100 may include a power supply 116.

Client software and databases may be accessed by the controller or processor 104 from the memory, and may include, for example, database applications, word processing applications, video processing applications as well as components that embody the decision support functionality of the present invention. The user access data may be stored in either a database accessible through a database interface or in the memory. The handheld device 100 may implement any operating system, such as Windows or UNIX, for example. Client and server software may be written in any programming language, such as ABAP, C, C++, Java or Visual Basic, for example.

Figure 2:
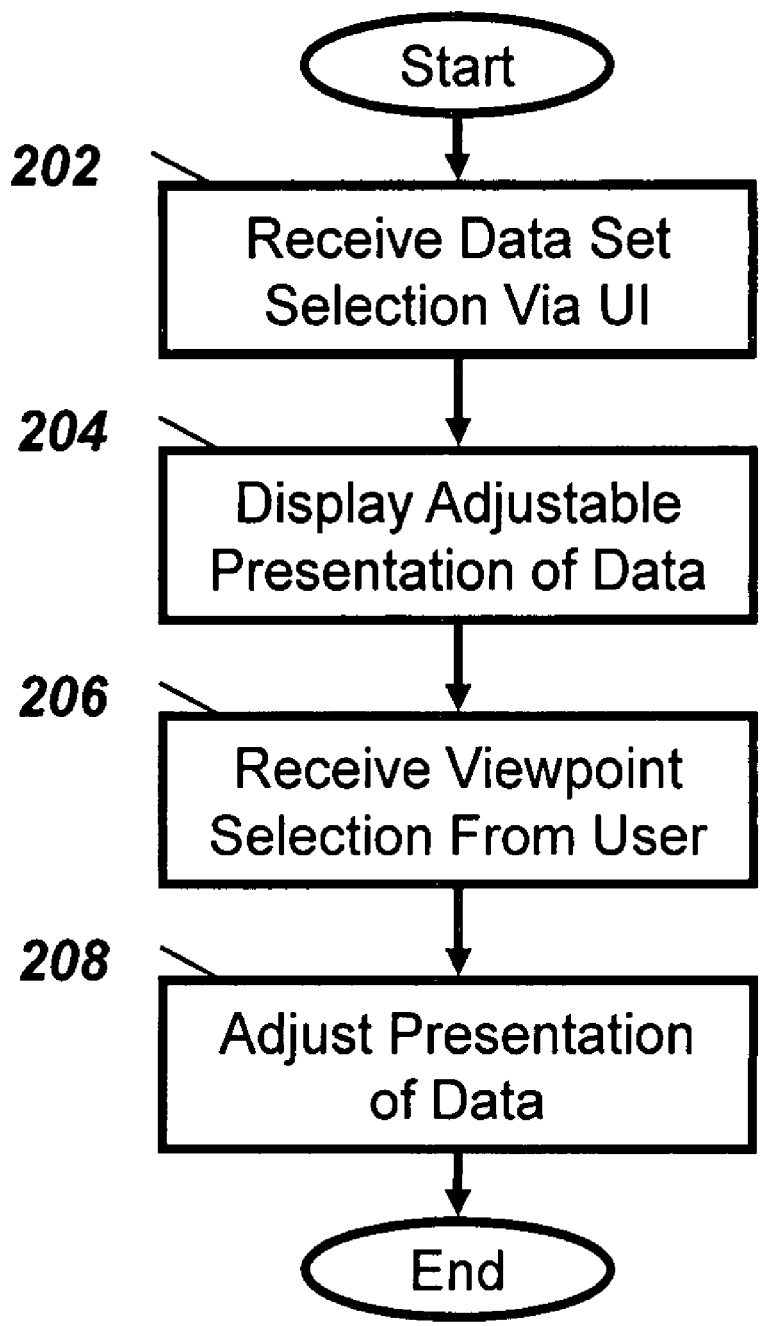
FIG. 2 illustrates in a flowchart one embodiment of a method for displaying data with a mobile device.

FIG. 2 illustrates in a flowchart one embodiment of a method 200 for displaying a presentation of data with a mobile device 100. A mobile device 100 may receive a data set selection from a user via a user interface (UI) 110 (Block 202). The mobile device 100 may display a presentation of data via the user output device 112 (Block 204). The presentation of data may be adjustable, as well as the viewpoint of the presentation of data. The mobile device 100 may receive a viewpoint selection of the presentation of data from the user via the UI 110 (Block 206). The viewpoint selection may represent an indication of the preferred presentation of the dataset. A viewpoint selection may be a selection of a degree of magnification, selection of a portion of the presentation of data to be displayed, rotation of the portion of the presentation of data being displayed, or other viewpoint selections. The mobile device 100 may adjust the presentation of data to the user (Block 208).

Figure 3:
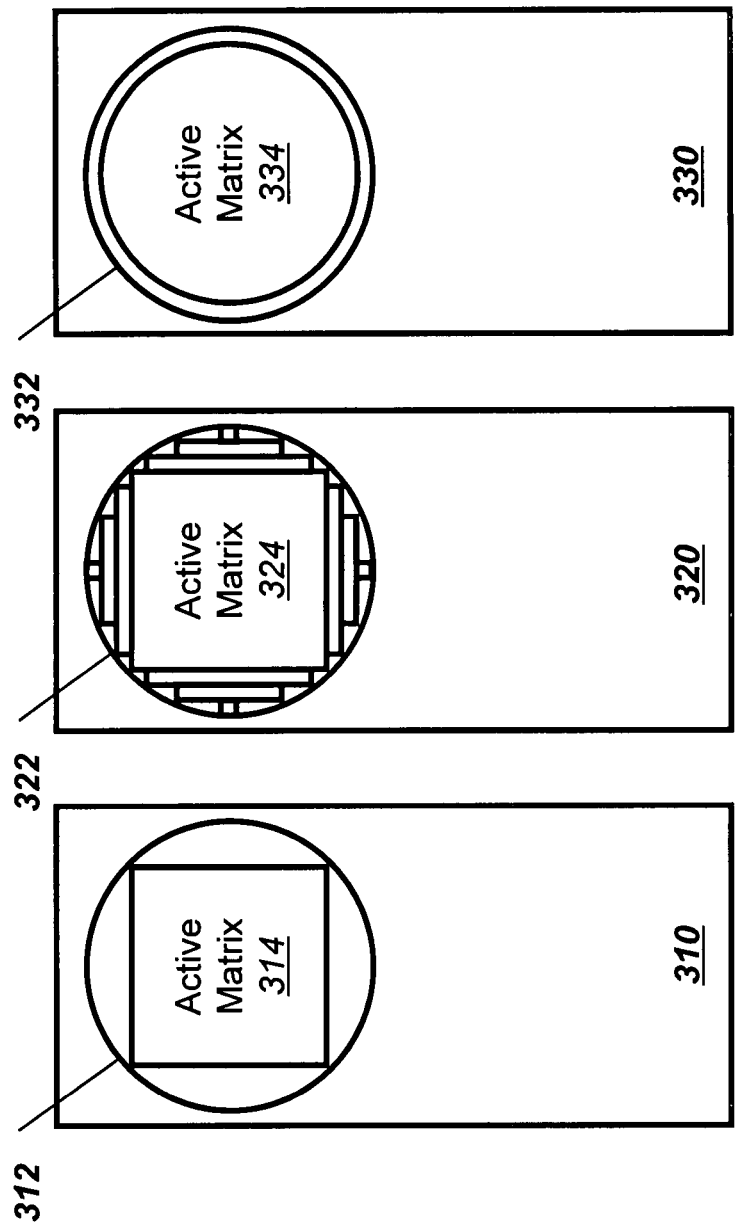
FIG. 3 illustrates in a block diagram multiple embodiments of a mobile device with a non-rectangular liquid crystal display.

FIG. 3 illustrates in a block diagram multiple embodiments 300 of a mobile device with a non-rectangular addressable liquid crystal display LCD). An LCD may include a screen, a set of pixels to create an image, and a backing lights source. The set of pixels may be organized into an active matrix of pixels, shaped to produce an image behind the screen. In one embodiment, a mobile device 310 may project an image on a non-rectangular LCD 312 using a rectangular active matrix 314. In this embodiment, while the screen of the LCD 312 is non-rectangular, the pixels are arranged in a rectangular matrix 314 under the screen, wasting portions of the available screen. In an alternate embodiment, a mobile device 320 may project an image on a non-rectangular LCD 322 using multiple contiguous rectangular active matrices 314. In this embodiment, while the screen of the LCD 322 is non-rectangular, the pixels are arranged in a series of rectangular matrices 324 under the screen, wasting portions of the available screen. In a different embodiment, a mobile device 330 may project an image on a non-rectangular LCD 332 using a non-rectangular active matrix 334. In this embodiment, the screen of the LCD 332 and the arrangement of the pixels in the matrix 334 are non-rectangular, most efficiently using the LCD screen.

A non-rectangular LCD may be used to display a presentation of data not normally presentable in a rectangular display, such as pie charts, maps, clocks, holographic images of objects, and other presentations of data. The presentation of data may be controlled by a display-integrated control, such as a display integrated control key. A display-integrated control may be a control that incorporates some aspect of the display to control the data presented on the display. A display integrated control key may be partially integrated, having both display elements and non-display elements, such as an addressable "soft key" control key. An addressable "soft key" control key is a blank key whose function is assigned by a processor. The function of the soft key may be displayed to the user on the display above the addressable blank key. A display integrated control key may be fully integrated, having only display elements, such as a touch screen key. A touch screen key presents the image of a key to a user, the image identifying the function of the key. A user may select the function by touching the image. A pressure sensitive touch screen receives the touch and alerts the processor to initiate the identified function.

Figure 4:
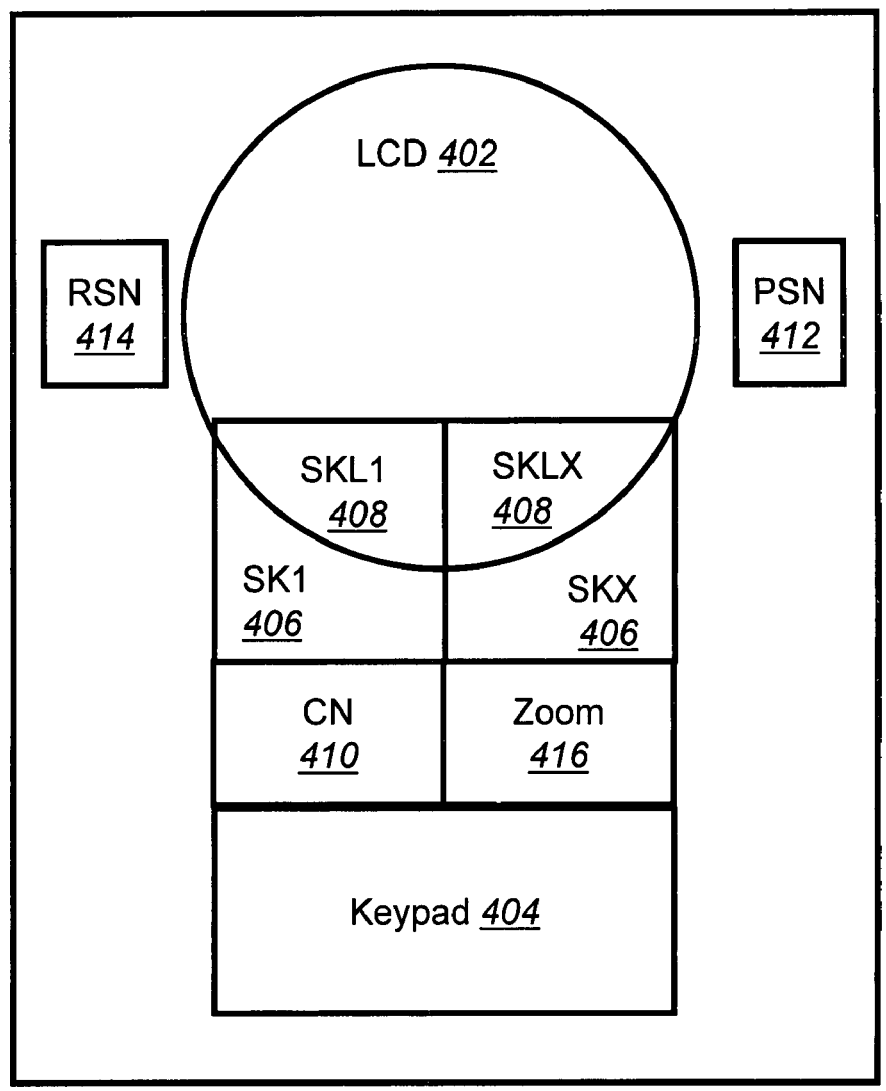
FIG. 4 illustrates in a block diagram one embodiment of a mobile device with a non-rectangular display and addressable controls.

FIG. 4 illustrates in a block diagram one embodiment of a mobile device 400 with a non-rectangular display and soft key controls. The mobile device 400 may have a non-rectangular LCD 402 to display a presentation of data. The mobile device 400 may have a keypad 404 for entering and controlling data stored in the mobile device. The mobile device 400 may have a set of addressable soft keys (SK) 406 for selecting, building, and controlling the presentation of the data. The LCD 402 may display a soft key label (SKL) 408 for each of the SKs 406 in use. The SKL 408 may describe the function of the SK 406.

A cursor navigation (CN) control 410 may be used to select data points in the set of data in the presentation of data. A page scrolling navigation (PSN) control 412 may be used to move the presentation of data to show a portion of the presentation of data not shown in the display 402. A rotational scrolling navigation (RSN) control 414 may be used to change the orientation of the portion of the presentation of data shown in the display 402. The scrolling navigation controls may be located on the perimeter of the display 402, elsewhere on the device, or connected as a separate control unit. A zoom control 416 may be used to increase the magnification of the portion of the presentation of data shown in the display 402.

Figure 5:
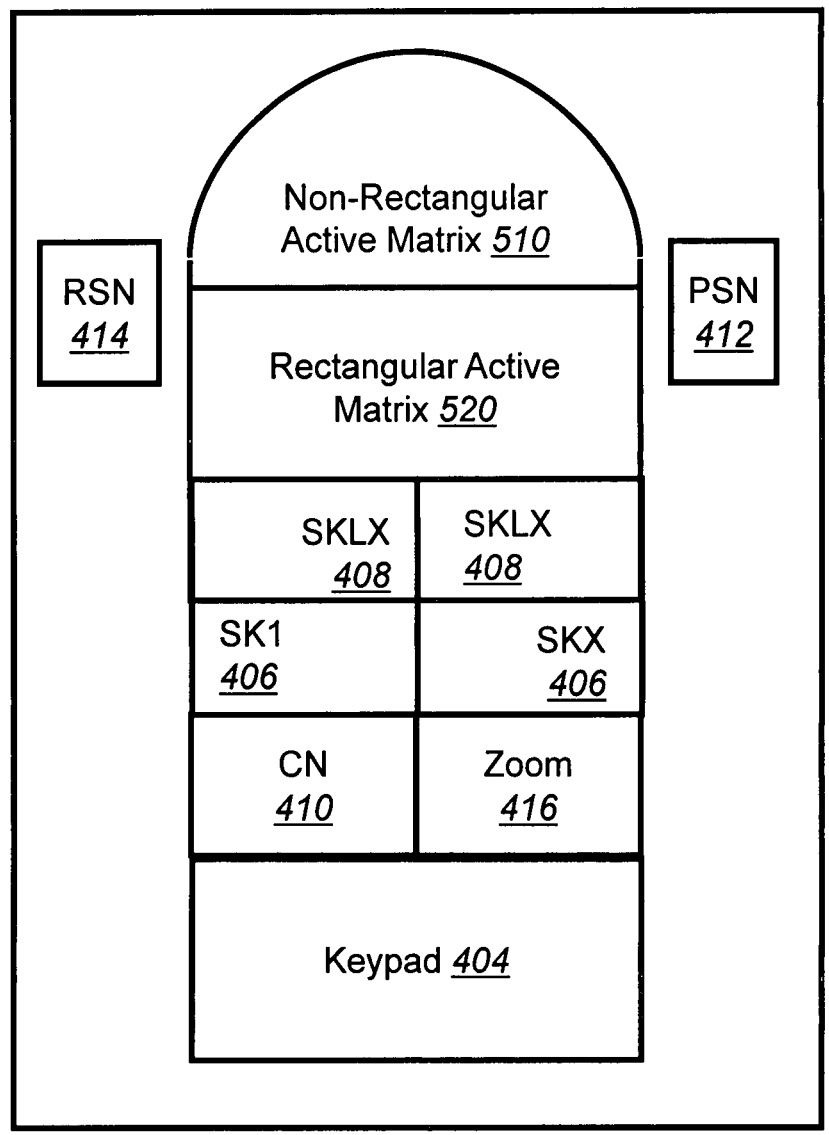
FIG. 5 illustrates in a block diagram one embodiment of a mobile device.

While a circular LCD with a circular active matrix is shown, any shape may be used that efficiently displays the presentation of data. Multiple matrices may be arranged contiguously to best support the shape of the LCD. FIG. 5 illustrates in a block diagram one embodiment of a mobile device 500 with an LCD with multiple matrices. The LCD may have a non-rectangular active matrix 510 and a rectangular active matrix 520.

Figure 6:
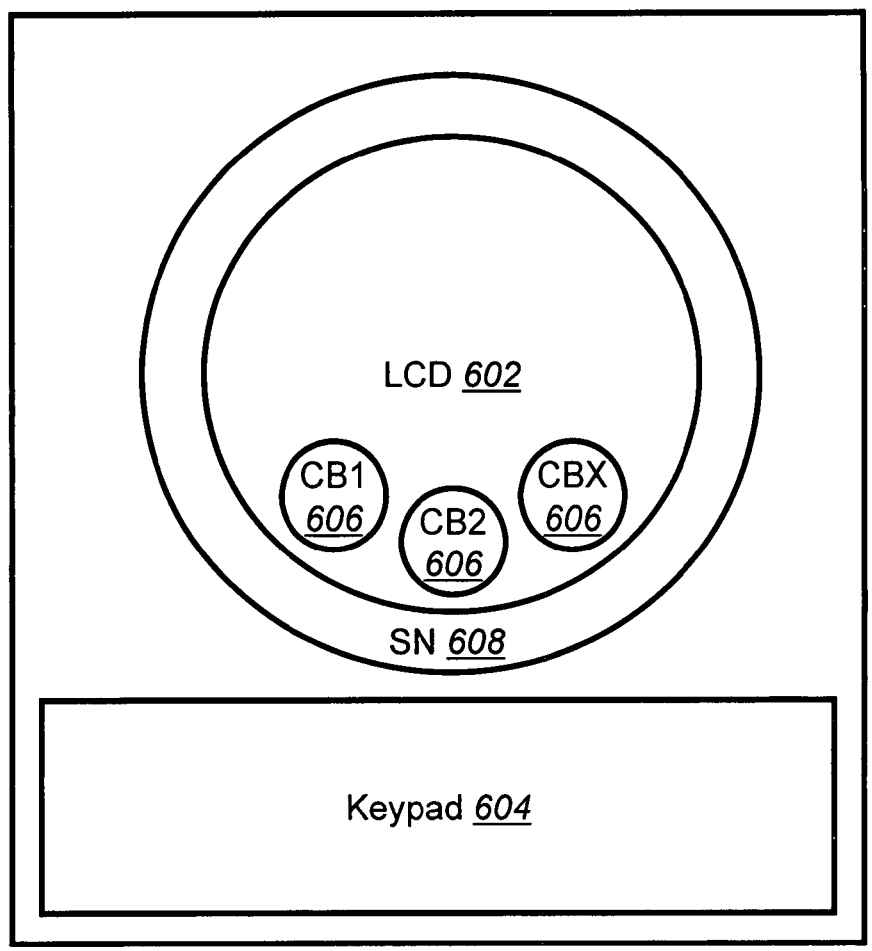
FIG. 6 illustrates in a block diagram one embodiment of a mobile device that uses a non-rectangular touch screen display.

FIG. 6 illustrates in a block diagram one embodiment of a mobile device 600 that uses a touch screen display. The touch screen display may be a display screen that responds to contact, providing a further user control. The mobile device 600 may have a non-rectangular LCD 602 to display a presentation of data. The mobile device 600 may have a keypad 604 for entering and controlling data stored in the mobile device. The non-rectangular LCD 602 may be a touch screen, allowing data points to be selected by receiving touch inputs to the presentation of data. The non-rectangular LCD 602 may present a set of touch control buttons (CB) 606 for controlling the presentation of data. A user may control a cursor on the screen by touching a point and dragging along the touch screen 602. The non-rectangular LCD 602 may present a scrolling navigation (SN) control 608 to the user. The SN control 608 may be positioned on the perimeter of the touch screen, or elsewhere on the touch screen. The SN control 608 may be present on the entire screen, dependant on the input to register as a scrolling navigation. For instance, a user may drag one finger across the screen to signal cursor control and two fingers across the screen to signal scrolling navigation. The SN control 608 may be toggled between a PSN control, RSN control, a zoom control, and other controls affecting the viewpoint of the presentation of data.

Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method of displaying data in a mobile device comprising:
    displaying an adjustable presentation of data on a non-rectangular addressable liquid crystal display with a non-rectangular active area active matrix; and
    controlling display of the presentation of data with a display-integrated control key.

2. The method of claim 1, wherein the display-integrated control key is a soft key.

3. The method of claim 1, wherein the display-integrated control key is a touch screen key.

4. The method of claim 1, wherein the non-rectangular active area active matrix is a circular active area active matrix.

5. The method of claim 1, further comprising displaying data on the non-rectangular liquid crystal display with a rectangular active area active matrix contiguous with the non-rectangular active area active matrix.

6. The method of claim 1, further comprising:
scrolling through the adjustable presentation of the data with a scrolling navigation control.

7. The method of claim 6, wherein the scrolling navigation control is a perimeter touch screen scrolling navigation control.

8. A non-rectangular addressable liquid crystal display apparatus for displaying data comprising:
a non-rectangular active area active matrix that displays an adjustable presentation of data; and
a display-integrated control key that controls the presentation of data.

9. The non-rectangular addressable liquid crystal display apparatus of claim 8, wherein the display-integrated control key is a soft key.

10. The non-rectangular addressable liquid crystal display apparatus of claim 8, wherein the display-integrated control key is a touch screen key.

11. The non-rectangular addressable liquid crystal display apparatus of claim 8, wherein the non-rectangular active area active matrix is a circular active area active matrix.

12. The non-rectangular addressable liquid crystal display apparatus of claim 8, further comprising a rectangular active area active matrix contiguous with the non-rectangular active area active matrix.

13. The non-rectangular addressable liquid crystal display apparatus of claim 8, further comprising a scrolling navigation control for scrolling through the adjustable presentation of the data.

14. The non-rectangular addressable liquid crystal display apparatus of claim 13, wherein the scrolling navigation control is a perimeter touch screen scrolling navigation control.

15. An electronic device for displaying data comprising:
a non-rectangular addressable liquid crystal display with a non-rectangular active area active matrix that displays an adjustable presentation of data; and
a scrolling navigation control for scrolling through the adjustable presentation of the data.

16. The electronic device of claim 15, further comprising a display-integrated control key that controls the presentation of data.

17. The electronic device of claim 16, wherein the display-integrated control key is a soft key.

18. The electronic device of claim 16, wherein the display-integrated control key is a touch screen key.

19. The electronic device of claim 15, wherein the scrolling navigation control is a perimeter touch screen scrolling navigation control.

20. The electronic device of claim 15, further comprising a rectangular active area active matrix contiguous with the non-rectangular active area active matrix.

* * * * *